United States Patent
Snoussi (10) Patent No.: US 9,405,911 B2
(45) Date of Patent: Aug. 2, 2016

(54) METHOD FOR SECURE BOOTING OF A PRINTER CONTROLLER

(71) Applicant: OCÉ-TECHNOLOGIES B.V., Venlo (NL)

(72) Inventor: Taha Snoussi, Evry (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 283 days.

(21) Appl. No.: 14/067,626

(22) Filed: Oct. 30, 2013

(65) Prior Publication Data

US 2014/0059338 A1 Feb. 27, 2014

Related U.S. Application Data

(63) Continuation of application No. PCT/EP2012/057629, filed on Apr. 26, 2012.

(30) Foreign Application Priority Data

May 4, 2011 (EP) .................................... 11305527

(51) Int. Cl.

| G06F 9/00 | (2006.01) |
|---|---|
| G06F 9/24 | (2006.01) |
| G06F 9/445 | (2006.01) |
| G06F 7/04 | (2006.01) |
| G06F 21/57 | (2013.01) |
| G06F 9/44 | (2006.01) |
| G06F 21/60 | (2013.01) |

(52) U.S. Cl.
CPC ............ *G06F 21/575* (2013.01); *G06F 9/4401* (2013.01); *G06F 9/4406* (2013.01); *G06F 8/61* (2013.01); *G06F 21/60* (2013.01); *G06F 2221/2129* (2013.01)

(58) Field of Classification Search
CPC ......... G06F 9/4401; G06F 21/60; G06F 8/61; G06F 21/575; G06F 9/4406
USPC .............................. 713/1, 2; 717/174; 726/26
See application file for complete search history.

(56) References Cited

U.S. PATENT DOCUMENTS

| 5,093,915 | A | 3/1992 | Platteter et al. | |
|---|---|---|---|---|
| 2002/0144104 | A1 | 10/2002 | Springfield et al. | |
| 2005/0081198 | A1* | 4/2005 | Cho ....................... | G06F 21/123 717/174 |
| 2006/0108979 | A1* | 5/2006 | Daniel .................. | H01M 2/105 320/112 |
| 2006/0282652 | A1 | 12/2006 | El-Haj-Mahmoud et al. | |
| 2010/0287363 | A1* | 11/2010 | Thorsen ................ | G06F 21/575 713/2 |
| 2010/0318731 | A1* | 12/2010 | Murray ................. | G06F 9/4401 711/104 |

FOREIGN PATENT DOCUMENTS

WO    WO 2007/123728 A2    11/2007

* cited by examiner

*Primary Examiner* — Ji H Bae
(74) *Attorney, Agent, or Firm* — Birch, Stewart, Kolasch & Birch, LLP (57) ABSTRACT

A printing system is provided with a secure boot program and a detachable memory device with an installable secure boot program. Upon switching on the printer controller, the secure boot program will check if a detachable memory device containing the secure boot program is plugged in. If this is the case, the controller will boot from the detachable memory device, otherwise the controller will invoke the printer control program to bring the printer in its normal operational mode.

6 Claims, 10 Drawing Sheets

| Address (Hex) | Description | | Size in bytes |
|---|---|---|---|
| 0000 | Code Area | | 440 |
| 01B8 | Optional Disk signature | | 4 |
| 01BC | Nulls; 0x0000 | | 2 |
| 01BE | Table of primary partitions (Four 16 byte entries) | | 64 |
| 01FE | 55h | MBR signature: 0xAA55 | 2 |
| 01FF | AAh | | |
| Total size MBR: | | | 512 |

31 → (rows 0000)
32 → (row 01BE)

FIG. 3

| Layout of one 16-byte partition record ||| 
|---|---|---|
| Offset | Field length (bytes) | Description |
| 0x00 | 1 | status (0x80 = bootable (*active*), 0x00 = non-bootable, other = invalid) |
| 0x01 | 3 | CHS address of first block in partition. The format is described in the next 3 bytes. |
| 0x01 | 1 | Head |
| 0x02 | 1 | sector is in bits 5–0; bits 9–8 of cylinder are in bits 7–6 |
| 0x03 | 1 | bits 7–0 of cylinder |
| 0x04 | 1 | Partition type |
| 0x05 | 3 | CHS address of last block in partition. The format is described in the next 3 bytes. |
| 0x05 | 1 | Head |
| 0x05 | 1 | sector is in bits 5–0; bits 9–8 of cylinder are in bits 7–6 |
| 0x06 | 1 | bits 7–0 of cylinder |
| 0x08 | 4 | LBA of first sector in the partition |
| 0x0C | 4 | Number of blocks in partition, in little endian format |

METHOD FOR SECURE BOOTING OF A PRINTER CONTROLLER

CROSS-REFERENCE TO RELATED APPLICATIONS

This application is a Continuation of co-pending PCT International Application No. PCT/EP2012/057629 filed on Apr. 26, 2012, and on which priority is claimed under 35 U.S.C. §120. This application also claims priority under 35 U.S.C. §119(a) to Application No. 11305527.1, filed in Europe on May 4, 2011. The entire contents of each of the above documents is hereby incorporated by reference into the present application.

BACKGROUND OF THE INVENTION

1. Field of the Invention

The present invention relates to a method for secure booting of a printer controller, the printer controller comprising a processor, a first memory, a second memory and a receptacle for receiving a third memory. Furthermore, the present invention relates to a printing system and to a memory device suited to be plugged in the receptacle for receiving the third memory.

2. Description of Background Art

Control programs for printers are complex programs optimized for attaining the best print results with specific hardware of the print engine and for attaining the best performance also for complex print jobs. In order to achieve this goal, such a printer control program is highly fine tuned to the processing hardware.

These programs are vulnerable to modification by unauthorized persons, malware attacks and viruses.

In order to secure these kinds of programs from manipulation in general, it is important to prevent an external program from being able to take control over such a printer control program. At boot time, when programs are loaded in memory for execution, and control is handed over from one program to a next program, there is a window in time that is vulnerable to a hostile attack of malware aiming to gain control. Therefore, there is a need for a secure booting method.

SUMMARY OF THE INVENTION

In view of the above, it is an object of the present invention to provide a secure booting method.

To address this object, a method for secure booting of a printer controller is provided, the printer controller comprising a processor, a first memory, a second memory and a receptacle for receiving a third memory, the second memory comprising a secure boot program; the method comprising the steps of, upon power on of the controller: executing an initial boot procedure; continuing booting from the second memory under control of the secure boot program; detecting if a third memory of a first type is inserted in the receptacle, where a third memory of the first type comprises a boot sector, a first identifier, an installation flag and a secure boot program suited for installation on the second memory; and in case a third memory of the first type is inserted in the receptacle and the installation flag is not set, continuing booting from the third memory.

With such a method of secure booting and its variants, achievements obtained are that, once the system has been installed, the secure boot program takes care that it is not possible to start from a foreign bootable USB key, but one from the first type or second type only; only in case the hard disk is not yet formatted, access is possible. A key of the first type that remains attached to the machine does neither jeopardize nor affect the software configuration in any way. So provided is a filter that only passes control to a trusted USB key, and that will not pass control to not trusted keys.

In an advantageous embodiment, the secure boot program is stored in an initial boot sector of the second memory. By installing the secure boot program in, e.g. a master boot record of a hard disk, it is not possible to prevent the secure boot program from executing upon booting from the hard disk.

In a further advantageous embodiment, where the third memory of the first type further comprises an installable operating system and an installable printer control program, upon detection of a third memory of the first type, the method comprises the additional steps of: in case the installation flag is not set, installing the secure boot program on the second memory, setting the installation flag and installing an operating system on the second memory; in case the installation flag is set, activating the operating system, checking if a printer control program has been installed already, and in case the printer control program has not yet been installed, installing the printer control program, and in case the printer control program has been installed, activating the printer control program for bringing the printer controller in a normal operational mode.

By installing the boot manager program at a pre-installation step, there is no unsecure window, since formatting and installing the secure boot program is done in a same step upon a first time insertion, after which booting from the privileged USB keys only is possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
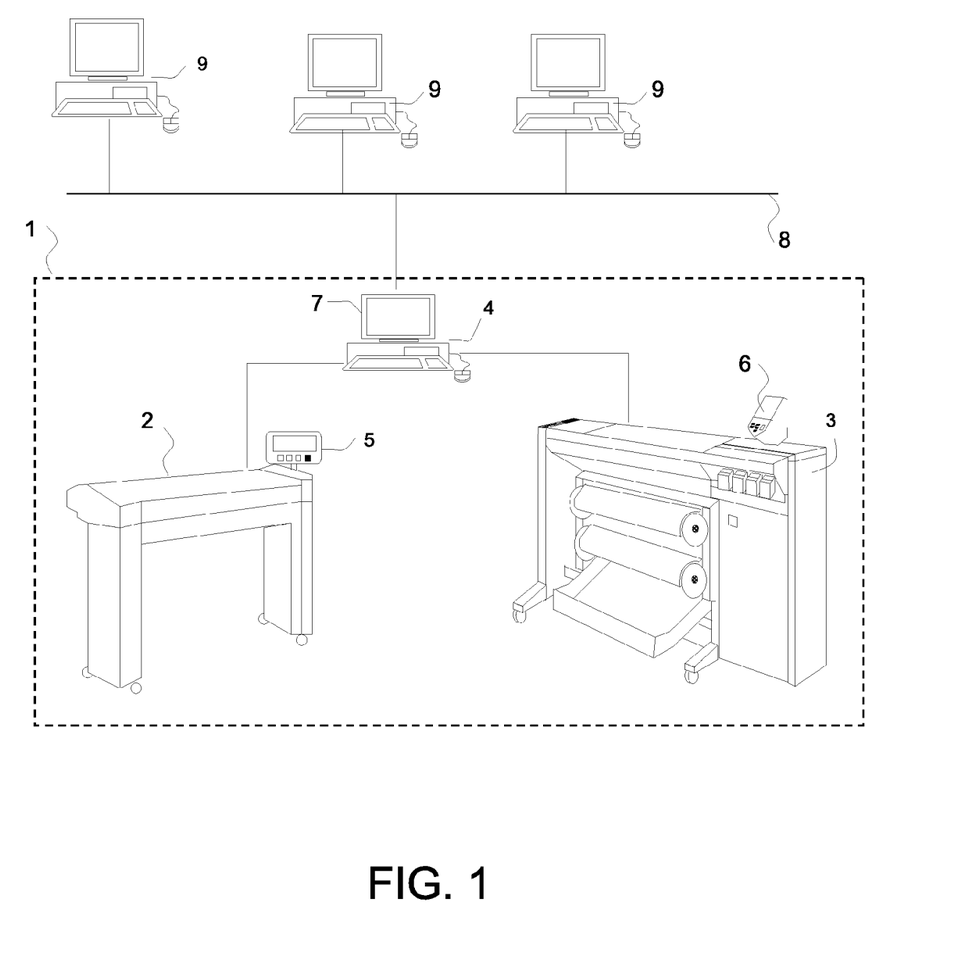
FIG. 1 is a schematic diagram of an environment comprising a reprographic system.

FIG. 1 is a schematic diagram of an environment, which comprises a reprographic system 1. The reprographic system 1 as presented here comprises a scanning device 2, a printing device 3 and a control unit 4. The control unit 4 is connected to a network 8, so that a number of client computers 9, also connected to the network 8, may make use of the reprographic system 1.

The scanning device 2 is provided for scanning an image carrying object. The scanning device 2 may be provided with a color image sensor (i.e. a photoelectric conversion device), which converts the reflected light into electric signals corresponding to the primary colors red (R), green (G) and blue (B). The color image sensor may be, for example, a CCD type sensor or a CMOS type sensor. A local user interface panel 5 is provided for starting scan and copy operations.

The printing unit 3 is provided for printing images on image receiving members. The printing unit may use any kind of printing technique. It may be an inkjet printer, a pen plotter, or a press system based on an electro-(photo)graphical technology, for instance.

The inkjet printer may be, for example, a thermal inkjet printer, a piezoelectric inkjet printer, a continuous inkjet printer or a metal jet printer. A marking material to be disposed may be a fluid like an ink or a metal, or a toner product. In the example shown in FIG. 1, printing is achieved using a wide format inkjet printer provided with four different basic inks, such as cyan, magenta, yellow and black. The housing contains a printhead, which is mounted on a carriage for printing swaths of images. The images are printed on an ink receiving medium such as a sheet of paper supplied by a paper roll. A local user interface panel 6 may be provided with an input device such as buttons.

The scanning device 2 and the printing device 3 are both connected to the control unit 4. The control unit 4 executes various tasks such as receiving input data from the scanning device 2, handling and scheduling data files, which are submitted via the network 8, controlling the scanning device 2 and the printing device 3, converting image data into printable data, etc. The control unit 4 is provided with a user interface panel 7 for offering the operator a menu of commands for executing tasks and making settings.

Figure 2:
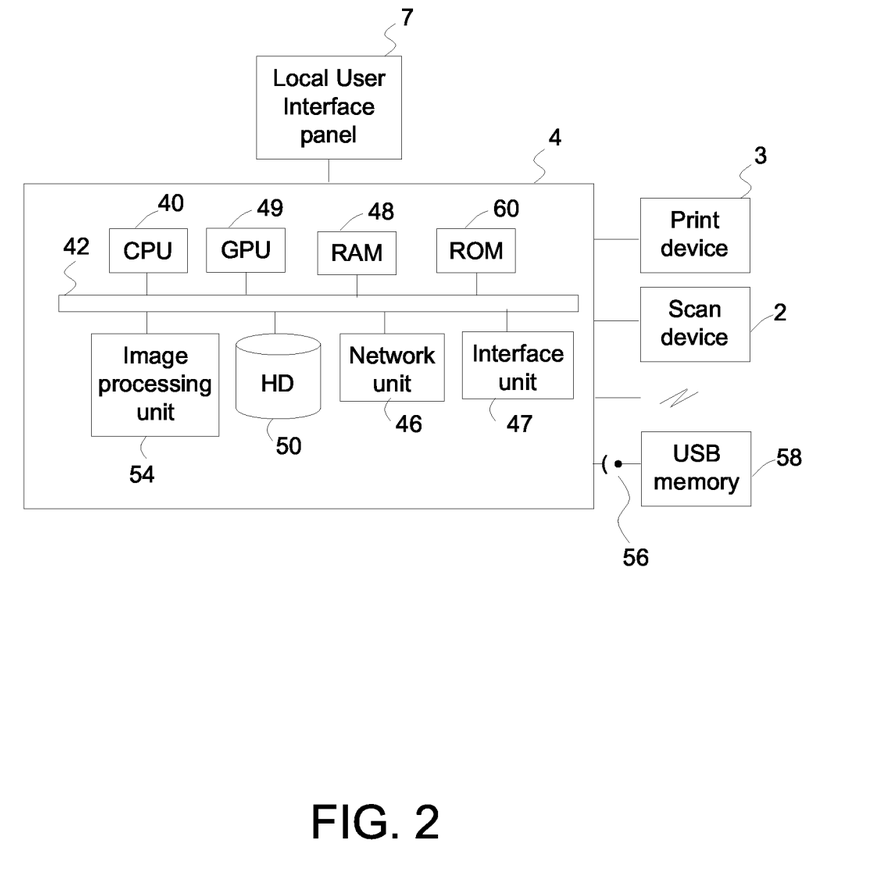
FIG. 2 is a schematic diagram of a control unit of the reprographic system according to FIG. 1.

An embodiment of the control unit 4 is in more detail presented in FIG. 2. As shown in FIG. 2, the control unit 4 comprises a Central Processing Unit (CPU) 40, a Graphical Processor Unit (GPU) 49, a Random Access Memory (RAM) 48, a Read Only Memory (ROM) 60, a network unit 46, an interface unit 47, a hard disk (HD) 50 and an image processing unit 54 such as a Raster Image Processor (RIP). The aforementioned units 40, 49, 48, 60, 46, 47, 50, 54 are interconnected through a bus system 42. However, the control unit 4 may also be a distributed control unit.

For the purpose of explanation, in the embodiment under consideration, the controller has an IBM PC architecture. The IBM PC architecture is well known in the art. However a person skilled in the art will recognize that the invention is also applicable with other architectures.

The CPU 40 controls the respective devices 2, 3 of the reprographic system 1 in accordance with control programs stored in the ROM 60 or on the HD 50 and the local user interface panel 7. The CPU 40 also controls the image processing unit 54 and the GPU 49.

The ROM 60 stores programs and data such as an initial boot program, a set-up program, various set-up data or the like, which are to be read out and executed by the CPU 40.

Figure 3:
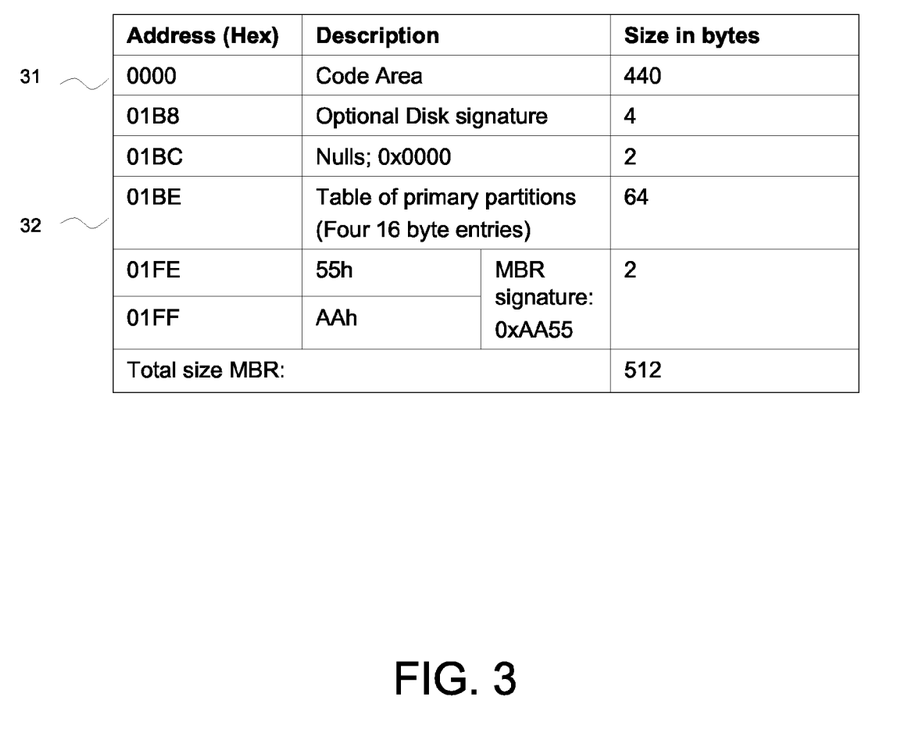
FIG. 3 schematically illustrates the structure of a Master Boot Record.

The hard disk 50 is an example of a non-volatile storage unit for storing and saving programs and data which make the CPU 40 execute a print process to be described later. The hard disk is provided with a Master Boot Record (MBR). A Master Boot Record is a first sector (typically 512 bytes) of a partitioned data storage device. The structure of a Master Boot Record is depicted in FIG. 3. A first area (31), from address 0 up to 0x01B8 is available for program code. Another area (32), from address 0x01BE up to 0x01FE contains a table of primary partitions. Finally, addresses 0x01FE-0x01FFA contain the hex word 0xAA55, known as the MBR signature, indicating that it is a valid MBR.

Figure 4:
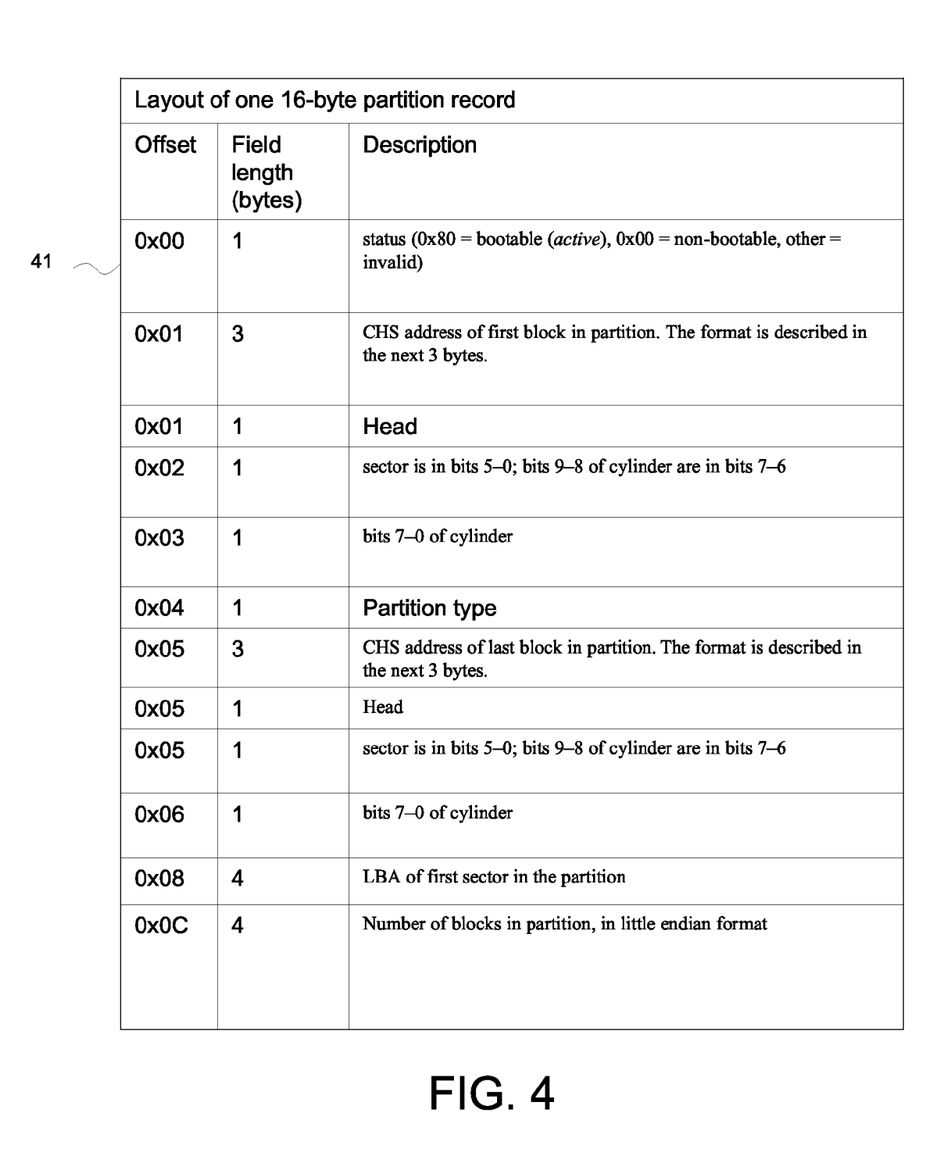
FIG. 4 depicts the lay out of one 16-byte partition record.

FIG. 4 depicts the lay out of one 16-byte partition record. The first byte (41) indicates if it is a bootable partition or a non-bootable partition. Any other value is invalid. The next three bytes give the CHS address of the first block in the partition.

A Volume Boot Record is the first sector of a particular partition on a data storage device that has been partitioned or it is the first sector of a data storage device that has not been partitioned.

The hard disk 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area which is used by the CPU 40 to execute various processes.

The interface unit 47 connects the control unit 4 to scanning device 2 and printing device 3, and provides a USB socket for receiving a USB memory device.

The network unit 46 connects the control unit 4 to the network 8 and is designed to provide communication with the workstations 9, and with other devices reachable via the network.

The image processing unit 54 may be implemented as a software component running on an operation system of the control unit 4 or as a firmware program, for example embodied in a field-programmable gate array (FPGA) or an application-specific integrated circuit (ASIC). The image processing unit 54 has functions for reading, interpreting and rasterizing the print job data. Said print job data contains image data to be printed (i.e. fonts and graphics that describe the content of the document to be printed, described in a Page Description Language or the like), image processing attributes and print settings.

Basic modes of operation for the reprographic system are scanning, copying and printing.

With the electric signals corresponding to the primary colors red (R), green (G) and blue (B) obtained during scanning, a digital image is assembled in the form of a raster image file. A raster image file is generally defined to be an array of regularly sampled values, known as pixels. Each pixel (picture element) has at least one value associated with it, generally specifying a color or a shade of grey, which the pixel should be displayed in. For example, the representation of an image may have each pixel specified by three 8 bit (24 bits total) values (ranging from 0-255) defining the amount of R, G, and B, respectively in each pixel. In the right proportions, R, G, and B can be combined to form black, white, shades of grey, and an array of colors.

The digital image obtained by the scanning device 2 may be stored on a memory of the control unit 4 and be handled according to a copy path, wherein the image is printed by the print device 3. Alternatively, the digital image may be transferred from the control unit 4 to a client computer 9 (scan-to-file path). A user of the client computer 9 may decide to print a digital image, which reflects the printing mode of operation of the system.

Initial Boot Procedure

Figure 5:
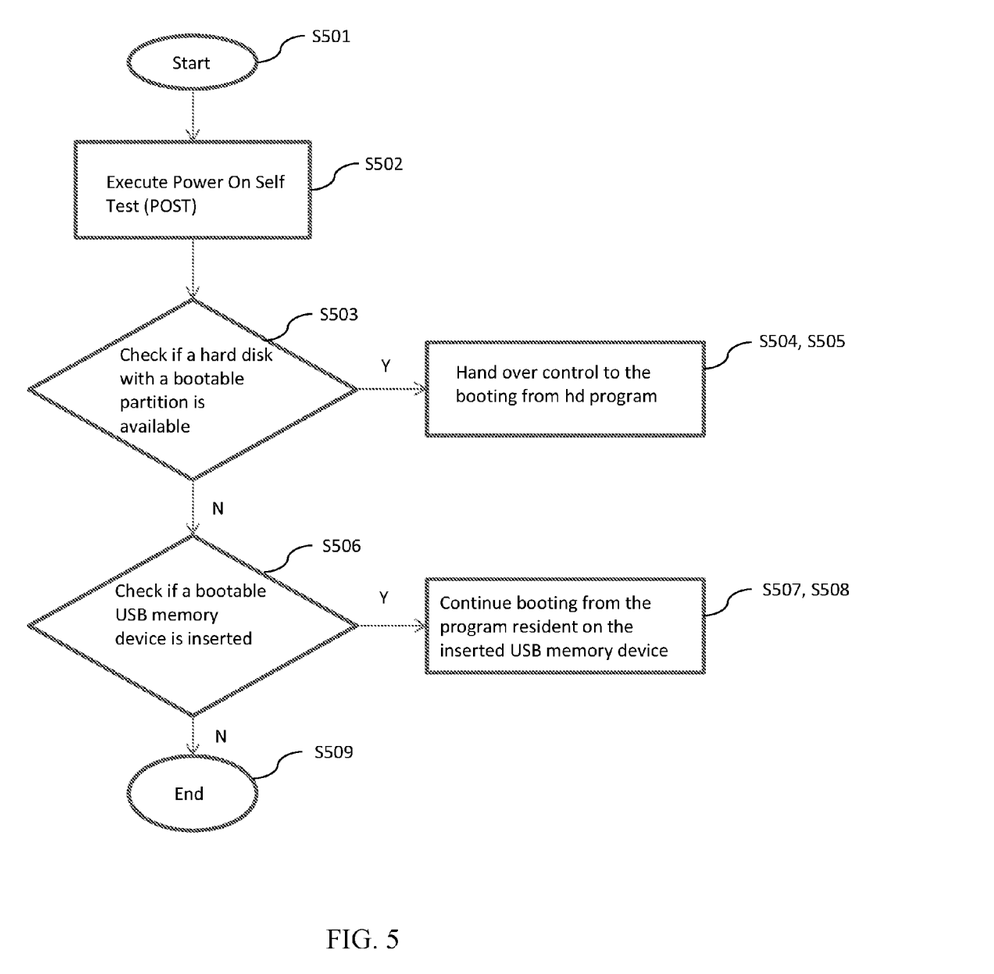
FIG. 5 illustrates an initialization procedure.

Upon switching on the controller, an initial boot procedure as depicted in FIG. 5 will be invoked. This boot procedure is known in the art.

With reference to FIG. 5, the initial boot procedure will be detailed further. The procedure is stored in ROM and at start up it will be invoked by the CPU (S501). Within the IBM PC architecture, this program is known as the BIOS (Basic Input Output System). After invocation, firstly, a so called Power On Self Test (POST) is executed (S502). This program initializes and tests the hardware components resident in the control unit. After finishing the Power On Self Test, the control unit is in a predefined status and the initialization procedure will proceed by accessing peripheral devices in order to load further instructions to be carried out from a peripheral device in system RAM. Heretofore, the BIOS program checks for bootable storage devices in a predetermined order until one is found.

A bootable storage device is characterized by the availability of a boot sector on it. A boot sector is a first sector on a memory device. To be a valid boot sector, it must end with the hex word 0xAA55. Kinds of boot sectors are: a Master Boot Record and a Volume Boot Record.

In the embodiment under consideration, the order, set in the BIOS, is: Hard Disk followed by USB storage device. So, after completion of the POST program (S502), a check is then carried out, if a hard disk with a bootable partition is available (S503).

If this is the case (Y), the program will hand over control (S504) to the booting from hd program (S505). This will be illustrated later. If this is not the case (N), a check is carried out, if a bootable USB memory device is inserted. If so (Y), booting will continue from the program resident on the inserted USB memory device (S507, S508). If not (N), the program will end and the apparatus will be switched off again (S509).

Boot Manager Program

According to the present invention, a boot manager program is added to the boot procedure. In the embodiment under consideration, a boot manager program is/will be stored in the master boot record of hard disk 50. In a variant, advantageous in case the boot manager program does not fit in the master boot record, a first part of the program is stored in the master boot record and next parts are stored in other sectors of the hard disk. Occasionally, the first part comprises only an instruction for the BIOS to load the relevant sectors in RAM and start execution. The boot manager program according to the present invention ensures that the controller software is protected against being brought under control of any other software control program that might be malicious or harmful, however whilst it remains possible to update the software, in which situation another, trusted program has to take control.

The Boot manager program is invoked during booting of the machine and responds, in dependence of the configuration at hand of hardware and software, by bringing the apparatus in a particular mode.

This boot manager program behaves differently in different modes of the apparatus. Modes to be discerned are: an operational mode, a diagnostic mode and an installation mode. Besides these modes, there is a pre-installation mode for installing the boot manager program on the apparatus.

Figure 6:
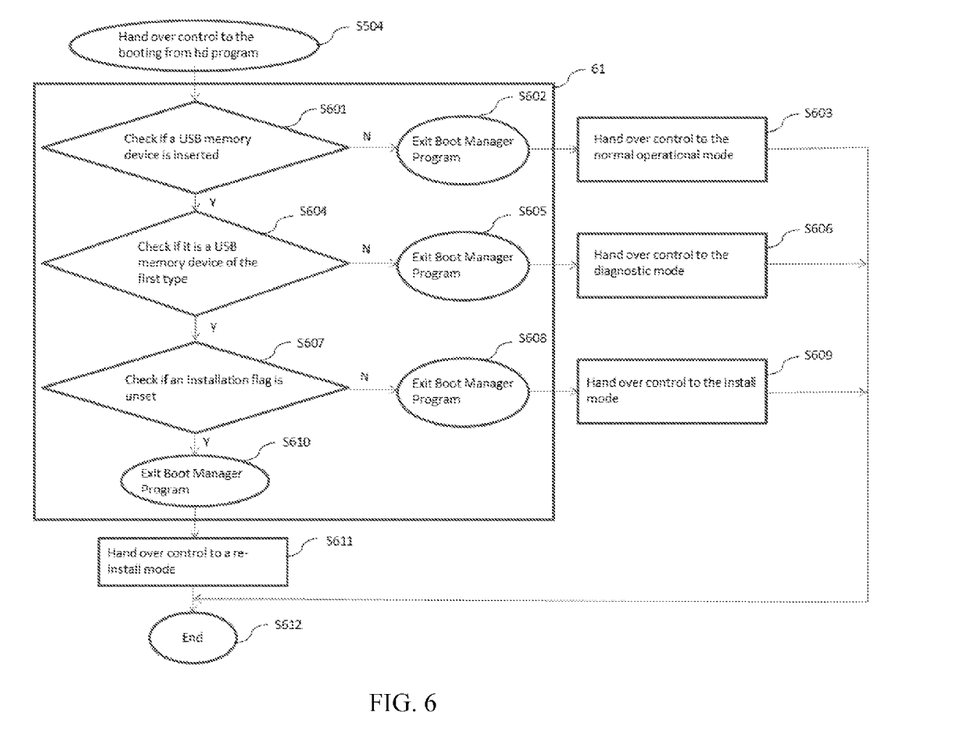
FIG. 6 illustrates the boot manager program together with its relationships with the different operational modes of the printer and with the initialization procedure.

FIG. 6 presents the boot manager program 61 together with its relationship with the different modes and its relationship with the initial boot procedure that is known in the art and has been described before with reference to FIG. 5.

After the controller is switched on, the initial boot procedure is started.

In step 504, control is handed over to the boot manager program, that is to say the boot manager program is loaded in RAM and starts execution. In a first step of the program (S601), it is checked if a USB memory device is inserted in receptacle 56, and if so, if it is provided with a boot sector, and is provided with a particular signature.

If not (N), because either no USB memory device is inserted, or a memory device is inserted, but it does not have a matching signature, the Boot Manager Program exits in step S602 and control is handed over to the normal operational mode (S603). The normal operational mode will be explained with reference to FIG. 7 later.

If the check in step S601 yields a confirmative outcome (Y), in a next step (S604), it is checked if it is a USB memory device of the first type, where a USB memory of the first type is a USB memory with programs for installing or reinstalling controller software, including the boot manager program, on the hard drive of the controller.

If not (N), it is a USB memory device of the second type, suited to bring the apparatus in a diagnostic mode. In this case, the Boot Manager program exits (S605) and control is handed over to the diagnostic mode (S606). In the diagnostic mode, a service operator is able to perform numerous tests.

If the outcome of step S604 is affirmative (Y), it is a USB memory device of the first type indeed and the method continues with step S607.

In step S607, it is checked if an installation flag is unset, indicating that it is a first time booting with the USB memory device of the first type.

If not (N), the apparatus is in installation mode, the Boot Manager program exits (S608) and control is handed over to the install mode (S609), whereafter the program continues with the install mode. The install mode will be further explained in a later section with reference to FIG. 9.

If the outcome of Step S607 is affirmative (Y), the Boot Manager program exits (S610) and control is handed over to a re-install mode (S611), whereafter the program continues with the re-install mode (S611). In this situation a re-install is effectuated.

In all cases, when any of the programs S603, S606, S609 and S611 exits, the apparatus is switched off in step S612.

The effects of the boot manager program according to the present invention will now be illustrated with reference to the other parts of the control software and the various modes.

Figure 7:
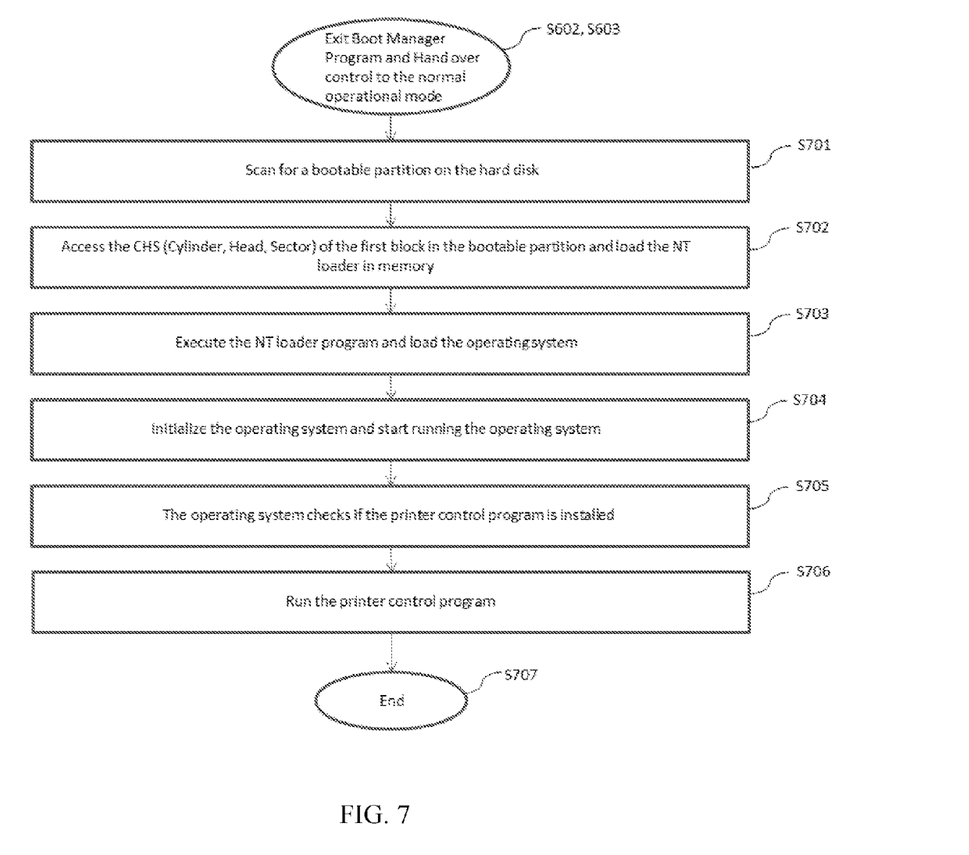
FIG. 7 illustrates reaching the normal operational mode.

Normal Operational Mode (FIG. 7)

In the normal operational mode, the apparatus is ready for executing print, scan and copy jobs. After switching on of the apparatus, the normal operational mode is reached when the Boot Manager program reaches step S602 according to FIG. 6. The normal operational mode is depicted in FIG. 7. In step S602, the Boot Manager program hands over control to the operational mode. Next, in step S701, it will scan for a bootable partition on the hard disk. Heretofore, the partition table is consulted (FIG. 4). The first byte of a 16 byte entry indicates if a partition is bootable (0x80) or non-bootable (0x00). In the embodiment under consideration, the first partition is bootable. The CHS (Cylinder, Head, Sector) of the first block in the sector is given. In step S702, this block is accessed and the code available there, being the NT Loader, is loaded in memory. Subsequently, in step S703, The NT Loader program is executed and loads the operating system, which is, in the embodiment under consideration, Windows XP. However, Windows 7/Windows ES 7 may equally be applied. In step S704, the operating system is initialized and starts running. In step S705, Win XP checks if the printer control program is installed, and if so starts the printer control program. In step S706, the printer control programming is up and running.

The printer is now ready for use. The apparatus is available for carrying out jobs in response to commands entered via the local user interface or in response to jobs received via the network, until the apparatus is switched off in step S707.

Diagnostic Mode

If the Boot Manager program results in the detection of a USB memory device of the second type, a diagnostic program is loaded and given control.

Installation

Also, installation of the boot manager program as part of the installation of the controller software on the machine is provided with necessary precautions according to the present invention in order to prevent intrusion of malicious software in the machine in the course of the installation process.

The installation method according to the present invention comprises a pre-installation phase and an installation phase.

Pre-Installation Mode

The pre-installation phase will be explained next. Prerequisite is a hardware configuration according to FIG. 2 with a USB memory of the first type inserted and a software configuration where the hard disk is unformatted and does not contain any software yet. ROM module 60 comprises the initial boot program, e.g. a conventional BIOS program.

Figure 8:
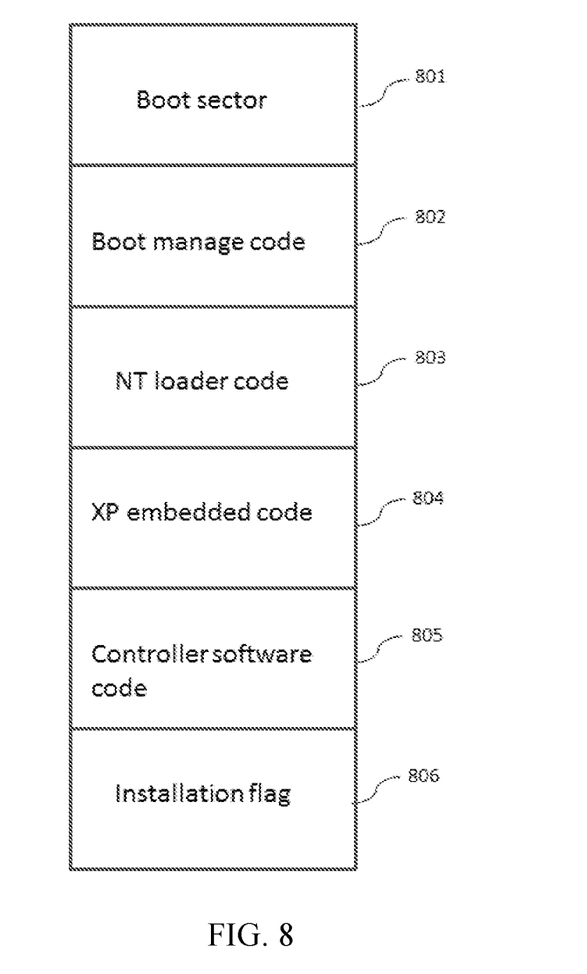
FIG. 8 illustrates a configuration of a USB device.

FIG. 8 provides a view of the code resident on the USB device of the first type. Resident are a boot sector (801), comprising an identifier in the form of a particular signature, the signature being also indicative of the type, being in this case the first type; and one partition comprising boot manager code (802), NT loader code (803), XP embedded code (804), controller software code (805) and an installation flag (806) indicating a first time booting or a second time booting with the USB device. In one variant, the USB memory device comprises a key for secure identification of the device and in another, independent, variant, the installation flag is stored in the boot sector of the second memory.

Installation of the Boot Manager program according to the present invention is further explained with reference to FIG. 9. In the configuration under consideration, the hard disk does not yet contain any software and is not formatted. A USB key of the first type is inserted. This USB key is a bootable key and it contains software programs that have to be installed on the controller.

Upon switching on the controller, the initial boot procedure as explained before with reference to FIG. 5 will be invoked.

In the configuration under consideration, no bootable hard disk is available. So, according to FIG. 5 in step S506, the program will check if any bootable code on the USB key is available.

This is the case indeed, so the bootable code on the key will be loaded in RAM and will be executed, and control is handed over to it (S507) and the pre-installation program will start.

Figure 9:
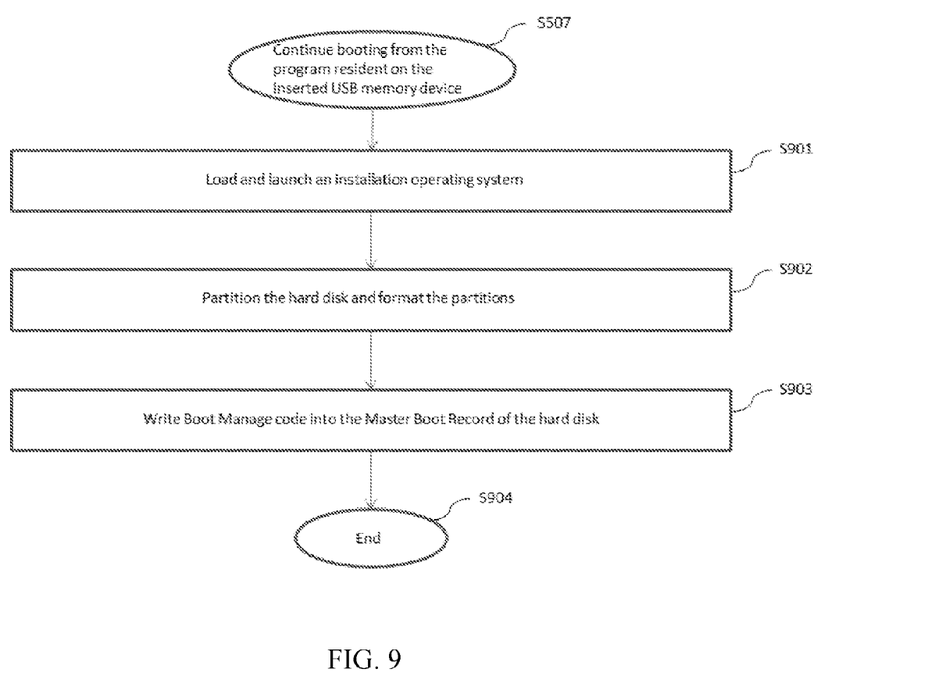
FIG. 9 illustrates the pre-installation mode.

With reference to FIG. 9, after getting control in S507, in a next step (S901) an installation operating system, available on the key, will be loaded and launched.

Under control of the installation operating system, pre-installation steps will be carried out. In step S902, the hard disk is partitioned and partitions are formatted. In step S903, Boot Manager code is written into the Master Boot Record of the hard disk; a normal mode operating system, e.g. WinXP embedded, is deployed; and the installation flag is set. Next, the apparatus has to be switched off (S904). This ends the pre-installation mode.

Figure 10:
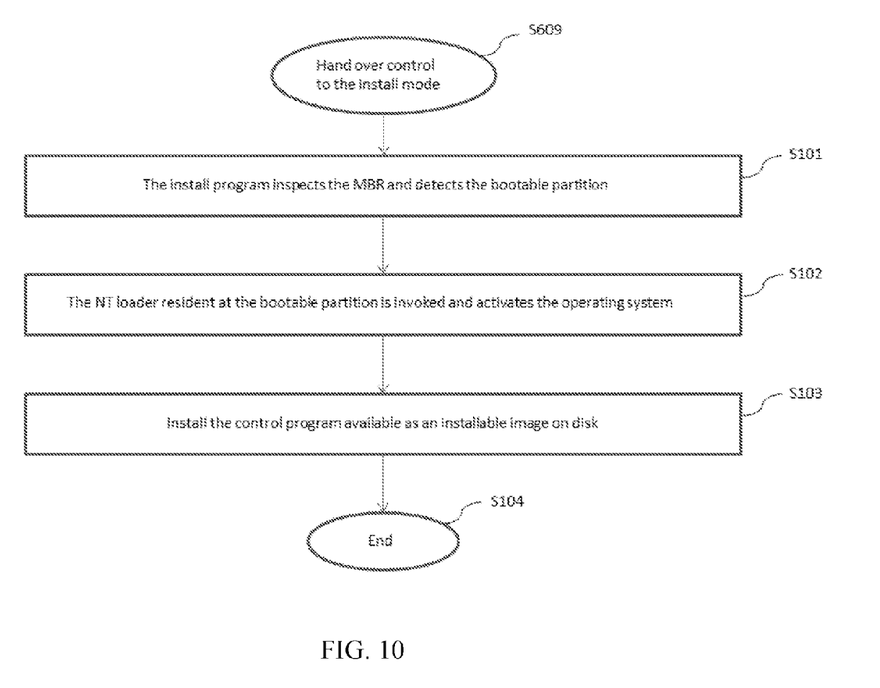
FIG. 10 illustrates the installation mode.

Installation Mode (FIG. 10)

In order to complete the installation, the installation mode has to be invoked after the pre-installation mode has been executed. In order to be able to execute the installation mode, insertion of the USB memory device of the first type into the receptacle 56 of the machine is required.

Upon switching on the apparatus after completion of the pre-installation mode, the initial boot procedure as depicted in FIG. 5 will be invoked. The initial boot procedure will inspect the MBR of the hard disk and the code available in the MBR of the hard disk will be loaded in RAM for execution. This is the Boot Manager program as depicted in FIG. 6, which is available now after the installation in the master boot record. With reference to FIG. 6, at first a check is carried out if a bootable USB memory device of the first or the second type is inserted (S601). This is the case (Y), so the method continues with a check if a USB key of the first type is inserted (S604). This is the case (Y), so the method continues with a check, if this is a first time booting or, if it is not a first time booting on the USB key of the first type (S607).

This is not the case, so in step S608, control will be handed over to the install program (S609).

The install program is presented in FIG. 10. After obtaining control in step 608, the install program takes control and starts executing. In step S101 the install program inspects the MBR and detects the bootable partition. Next, in step S102, the NT Loader resident at the bootable partition will be invoked and activates the WinXP operating system. In step S103, the control program is installed, that is available as an installable image on disk. In the final step S104, the apparatus is switched off automatically and the installation mode ends.

The next time the apparatus is switched on, it will enter the normal operational mode.

Re-Installation

In case of a re-installation, code has to be re-installed from a USB memory device of the first type. This implies that the boot manager program is already resident. And thus, the re-installation mode will be reached according to FIG. 6 in step S611. The system will continue with booting from the USB memory device and accordingly, the pre-installation mode and the installation mode as described before will be stepped through.

The invention is not limited to the above described embodiments. For example the USB memory device could also be any other detachable memory device. As a variant, the installation flag is stored on the boot sector of the second memory device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for secure booting of a printer controller, the printer controller comprising a processor, a first memory, a second memory and a receptacle for receiving a third memory, the second memory comprising a secure boot program, the method comprising the steps of, upon power on of the controller:
    executing an initial boot procedure;
    continuing booting from the second memory under control of the secure boot program;
    detecting if a third memory is inserted in the receptacle, wherein the third memory comprises a boot sector and a particular signature;
    if the third memory is inserted,
        detecting if the third memory is of a first type, wherein a third memory of the first type comprises the boot sector, the particular signature, a first identifier, an installation flag and a secure boot program suited for installation on the second memory;

if the third memory is of the first type, continuing booting from the third memory if the installation flag is set;

continuing booting from the second memory and bringing the printer controller in a re-stall mode if the installation flag is unset;

if the third memory is not of the first type, continuing booting from the second memory and bringing the printer controller in a diagnostic mode;

if the third memory is not inserted, continuing booting from the second memory and bringing the printer controller in a normal operational mode.

2. The method according to claim 1, wherein the third memory of the first type further comprises an installable operating system and an installable printer control program, and wherein the method further comprises steps of:

if the installation flag is not set, installing the operating system on the second memory, setting the installation flag and rebooting the printer controller; and if the installation flag is set, activating the operating system, checking if a printer control program has been installed already and:

if the printer control program has not yet been installed, installing the printer control program; and if the printer control program has been installed, activating the printer control program for bringing the printer controller in a normal operational mode.

3. The method according to claim 1, wherein the secure boot program is stored in an initial boot sector of the second memory.

4. The method according to claim 3, wherein the second memory is a hard disk and the initial boot sector is a master boot record.

5. The method according to claim 1, further comprising the steps of:

detecting if a third memory of a second type is inserted in the receptacle, wherein a third memory of a second type comprises a boot sector, a second identifier and a diagnostic program;

continuing booting from the third memory and loading and executing the diagnostic program if a third memory of the second type is inserted in the receptacle; and continuing booting from the second memory, if no memory of the first type or the second type is inserted in the receptacle.

6. A detachable memory device configured to be inserted in a receptacle of a printer controller, the detachable memory device comprising:

a boot section;

a particular signature; and a secure boot program configured to be installed on a memory of the printer controller, and after installation configured to:

check if a third memory of a first or second type is inserted in the receptacle, and if not, bringing the printer controller in a normal operational mode;

if a third memory of a first type is inserted in the receptacle, check an installation flag, wherein a third memory of the first type comprises the boot sector, the particular signature, a first identifier, the installation flag and the secure boot program suited for installation on the second memory;

if the installation flag is not set, execute the step of continuing booting from the third memory, install the secure boot program on the second memory, set the installation flag and install an operating system on the second memory; and if the installation flag is set, activate the operating system, check if a printer control program has been installed already and, if the printer control program has not yet been installed, install the printer control program and, if the printer control program has been installed, activate the printer control program for bringing the printer controller in a normal operational mode.

* * * * *